Mar. 27, 1923.

W. F. HOLCOMB.
FEEDER FOR FORAGE MACHINES.
FILED DEC. 29, 1922.

1,449,510.

INVENTOR
Wm. F. Holcomb
BY Geo. H. Beeler
ATTORNEY

Patented Mar. 27, 1923.

1,449,510

UNITED STATES PATENT OFFICE.

WILLIAM F. HOLCOMB, OF CLAY CENTER, NEBRASKA.

FEEDER FOR FORAGE MACHINES.

Application filed December 29, 1922. Serial No. 609,669.

*To all whom it may concern:*

Be it known that I, WILLIAM F. HOLCOMB, a citizen of the United States, residing at Clay Center, in the county of Clay and State of Nebraska, have invented certain new and useful Improvements in Feeders for Forage Machines, of which the following is a specification.

This invention relates generally speaking to feed grinders or forage machines and has particular reference to feeding mechanism for such machines.

Referring especially to the type of forage machines in which the material is reduced by the action of beaters or so called "hammers" until it is fine enough to pass through a grading means or screen, it frequently occurs, especially when the material is damp and tough, that there is a tendency to clogging or choking of the movable parts of the machine, the result of which is a considerable degree of loss of time and other annoyance.

Among the objects of the invention is to provide a forage machine having a novel combination or correlation between the reducing means and the feeding devices for conveying material to the reducing means, as more particularly set forth and claimed below.

A further object of the invention is to provide improved mechanism over which the material is delivered from the feeding mechanism and whereby the rotating parts of the cylinder will initially act thereon in the reducing action.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1:
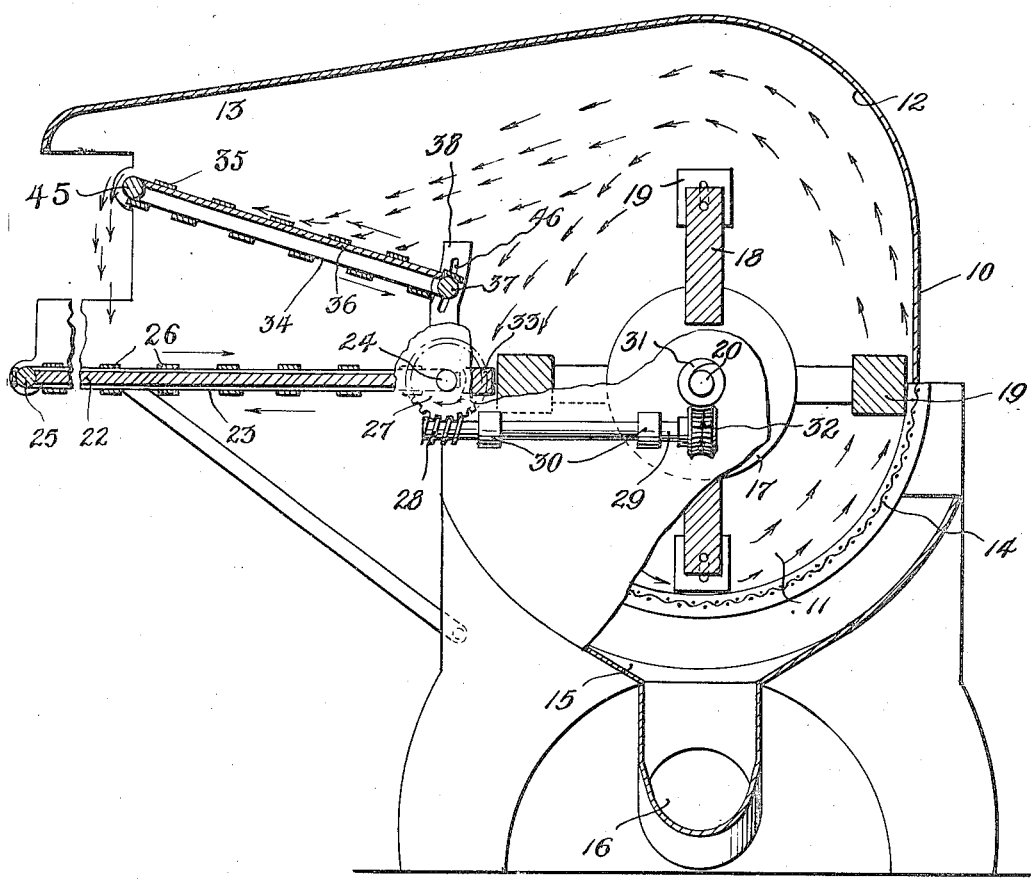
Figure 1 is a partial side elevation and partial vertical longitudinal section showing a preferred embodiment of my improvement as applied to a well known type of forage machine.
Figure 2:
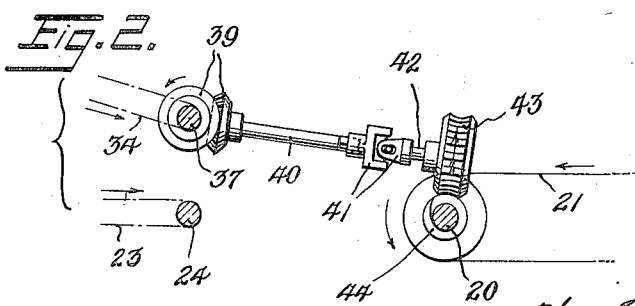
Fig. 2 is a diagrammatic detail view of the driving mechanism for the auxiliary conveyer.

Referring now more specifically to the drawings the machine illustrated comprises a casing 10 embodying at least in its lower portion a cylinder space 11, and which will be referred to hereinafter as the "cylinder." The casing includes also a dome 12 of any suitable design or dimensions having a forward extension 13, the sides of the casing constituting closures for the operating parts. Bounding the cylinder at the bottom is a semicylindrical screen 14 made of any suitable mesh material whose perforations determine the fineness to which the material must be reduced in order to pass from the cylinder downward to any suitable place of deposit, such as a receptacle 15 having a discharge spout 16.

Within the cylinder is a drum 17 to which are fixed a series of arms 18, and the arms carry at their outer ends a series of beaters 19, commonly called hammers in this type of machine. The drum is mounted upon a shaft adapted to be operated at a high rate of speed from any suitable source of power, as through a belt 21.

22 indicates any suitably arranged or constructed feed table arranged preferably on about the level of the main shaft 20 and over which the hay, straw, fodder, or other material to be ground or reduced is caused to be passed by any suitable means. For this purpose I indicate an endless conveyer 23 operating over and driven by a shaft or roller 24 adjacent to the cylinder, and guided idly over another roller 25 at the extreme front end of the table. This conveyer may be constructed of chains, belts, or other flexible members to which any suitable slats or flights 26 may be attached. The means indicated for driving this conveyer includes a worm wheel 27 fixed to the shaft or roller 24, the same being driven by a worm 28 fixed upon a counter shaft 29 journaled in bearings 30 and it in turn being driven from a worm 31 on the power shaft 20, meshing with the worm wheel 32 on the shaft 29.

Between the conveyer roller 24 and the path of the arms 19 is preferably located a strong rigid breaker bar 33, among the functions of which is to sustain the strain incident to the initial impact of the arms and hammers upon the feed as it is being conveyed into the cylinder space, and whereby the conveyer mechanism, which naturally is of a nature rendering it less able to sustain such impacts, is saved from such action of the hammers as would otherwise be destructive to the conveyer.

Located above the main feed conveyer is an auxiliary conveyer 34 comprising any suitable flexible chains or straps to which are attached slats or flights 35, the same operating over a table 36 and with a direction of movement opposite to that of the main conveyer. That is to say, the upper run of the auxiliary conveyer leads away from the cylinder, but its lower run leads toward the cylinder and co-operates for this reason with the feeding function of the conveyer 23. The conveyer 34 operates over and is driven by a roller 37 journaled in bearings 38 and driven by any suitable gearing such as miter gears 39 on the side of the machine opposite the shaft 29. One of the gears 39 is fixed to a shaft 40 having a universal or knuckle joint 41 with another shaft 42 to which is fixed a worm gear 43 meshing with and driven from a worm 44 on the opposite end of the main shaft 20 from the worm 41. The front end of the conveyer 34 is supported idly upon a roller 45 journaled in the sides of the casing. The throat or space between the cylinder ends of the conveyers may be enlarged or reduced by the adjustment of the roller 37 up or down along slots 46 formed in the bearings 38, the universal joint connection between the shafts 40 and 42 providing for such adjustment without disturbing the operation of the gearing.

While the auxiliary conveyer has an important function of assisting the main conveyer in carrying the feed to the cylinder, and by virtue of which I am able to secure much more dependable and satisfactory feed than has heretofore been accomplished in such machines, yet the main purpose of the auxiliary conveyer is to receive the surplus material from the cylinder and cause it to be carried forward again for delivery upon the main conveyer. This surplus material is such as tends to accumulate within the cylinder, especially when the material is damp or tough and for this reason has a tendency to clog or choke the reducing mechanism in the main casing. It will be observed that the action of the arms and hammers on such material is to cause the surplus to be thrown over upon the table 36 whence it is carried by the upper run of the conveyer 34 away from the cylinder and again delivered upon the main feed table. It will be noted also that the two conveyers considered together may be termed broadly "feeding means", and that such means are so constructed as to operate to wholly support free of independent movement, the material to be reduced or comminuted.

I claim:

1. A reducing device comprising a casing provided with upper and lower feeding devices at one side thereof, a rotor therein, provided with hammers, there being an unobstructed space within said casing between said hammers and said feeding devices, and said hammers in their upward movement being adapted to throw coarse material through said space on said upper feeding device to be returned for further reduction.

2. A reducing device comprising a casing, upper and lower feeding devices at one side thereof, a rotor mounted upon a horizontal axis within the casing and provided with hammers, there being an unobstructed space within the casing between the hammers and the feeding devices, and said hammers in their upward movement on the side of the axis remote from the feeding devices being adapted to throw coarse material through said space upon said upper feeding device to be returned for further reduction.

3. A reducing device comprising a casing, upper and lower feeding devices at one side thereof, the lower feeding device being longer at its receiving end than the upper feeding device whereby to receive material thereupon from the upper feeding device, a rotor within the casing and provided with hammers, there being an unobstructed space within the casing between the hammers and the upper feeding device, and said hammers in their upward movement being adapted to throw coarse material through said space upon said upper feeding device to be carried thereby to the lower feeding device and so returned for further reduction.

4. In a device of the character set forth, the combination with a casing and a rotor journaled therein and provided with hammers, of feeding means co-operating with the rotor and located at one side of the axis thereof, said feeding means being so constructed as to operate to wholly support free of independent movement the material to be comminuted, the hammers acting downward upon the material received from the feeding means, and there being an unobstructed space within the casing between the hammers and the feeding means, whereby the hammers in their upward movement are adapted to throw coarse material through said space to said feeding means to be thereby returned to the rotor for further reduction.

In testimony whereof I affix my signature.

WILLIAM F. HOLCOMB.